(12) United States Patent
He et al.

(10) Patent No.: US 11,853,221 B2
(45) Date of Patent: Dec. 26, 2023

(54) DYNAMIC PREFETCHING OF DATA FROM STORAGE

(71) Applicant: HEWLETT PACKARD ENTERPRISE DEVELOPMENT LP, Houston, TX (US)

(72) Inventors: Xiali He, Andover, MA (US); Alex Veprinsky, San Jose, CA (US); Matthew S. Gates, Houston, TX (US); William Michael McCormack, San Jose, CA (US); Susan Agten, Boise, ID (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/651,648

(22) Filed: Feb. 18, 2022

(65) Prior Publication Data

US 2023/0267077 A1 Aug. 24, 2023

(51) Int. Cl.
*G06F 12/0862* (2016.01)

(52) U.S. Cl.
CPC .... *G06F 12/0862* (2013.01); *G06F 2212/602* (2013.01)

(58) Field of Classification Search
CPC .............. G06F 12/0862; G06F 2212/602
See application file for complete search history.

(56) References Cited

U.S. PATENT DOCUMENTS

| | | | |
|---|---|---|---|
| 5,809,450 A | 9/1998 | Chrysos et al. | |
| 5,923,872 A | 7/1999 | Chrysos et al. | |
| 5,964,867 A | 10/1999 | Anderson et al. | |
| 6,000,044 A | 12/1999 | Chrysos et al. | |
| 6,092,180 A | 7/2000 | Anderson et al. | |
| 6,119,075 A | 9/2000 | Dean et al. | |
| 6,163,840 A | 12/2000 | Chrysos et al. | |
| 6,195,748 B1 | 2/2001 | Chrysos et al. | |
| 6,237,073 B1 | 5/2001 | Dean et al. | |
| 6,549,930 B1 | 4/2003 | Chrysos et al. | |
| 11,210,363 B1* | 12/2021 | Gao | G06F 16/958 |
| 2011/0113199 A1* | 5/2011 | Tang | G06F 15/8069 |
| | | | 711/143 |
| 2013/0013867 A1* | 1/2013 | Manne | G06F 12/0862 |
| | | | 711/137 |
| 2018/0239705 A1* | 8/2018 | Heirman | G06F 9/30047 |
| 2019/0213130 A1* | 7/2019 | Madugula | G06F 12/0895 |
| 2020/0356411 A1* | 11/2020 | Kim | G06F 12/126 |

OTHER PUBLICATIONS

Pekhimenko, University of Toronto, CSC D70: Compiler Optimization Prefetching, Mar. 21, 2019 (39 pages).
Lee et al., When Prefetching Works, When It Doesn't, and Why, ACM Transactions on Architecture and Code Optimization, vol. 9, No. 1, Article 2, Publication date: Mar. 2012 (29 pages).
Liao et al., Machine Learning-Based Prefetch Optimization for Data Center Applications, SC 09 Nov. 14-20, 2009, (11 pages).
Lu et al., The Performance of Runtime Data Cache Prefetching in a Dynamic Optimization System, Proceedings of the 36th International Symposium on Microarchitecture (MICRO-36 2003) (11 pages).
Wikipedia, Cache prefetching last edited Jan. 4, 2022 (4 pages).

* cited by examiner

*Primary Examiner* — Prasith Thammavong
(74) *Attorney, Agent, or Firm* — Trop, Pruner & Hu, P.C.

(57) ABSTRACT

In some examples, a system dynamically adjusts a prefetching load with respect to a prefetch cache based on a measure of past utilizations of the prefetch cache, wherein the prefetching load is to prefetch data from storage into the prefetch cache.

20 Claims, 5 Drawing Sheets

DYNAMIC PREFETCHING OF DATA FROM STORAGE

BACKGROUND

A system can include different types of storage. A first type of storage is a persistent storage used to store a relatively large amount of data. The persistent storage can be implemented with storage devices such as disk-based storage devices, solid state drives, and so forth. Another type of storage that can be included in the system is smaller but faster storage that can be used to cache a portion of the data stored in the persistent storage. The faster, smaller storage can be implemented using memory devices, such as dynamic random access memory (DRAM) devices, static random access memory (SRAM) devices, flash memory devices, so forth.

BRIEF DESCRIPTION OF THE DRAWINGS

Some implementations of the present disclosure are described with respect to the following figures.

Figure 1:
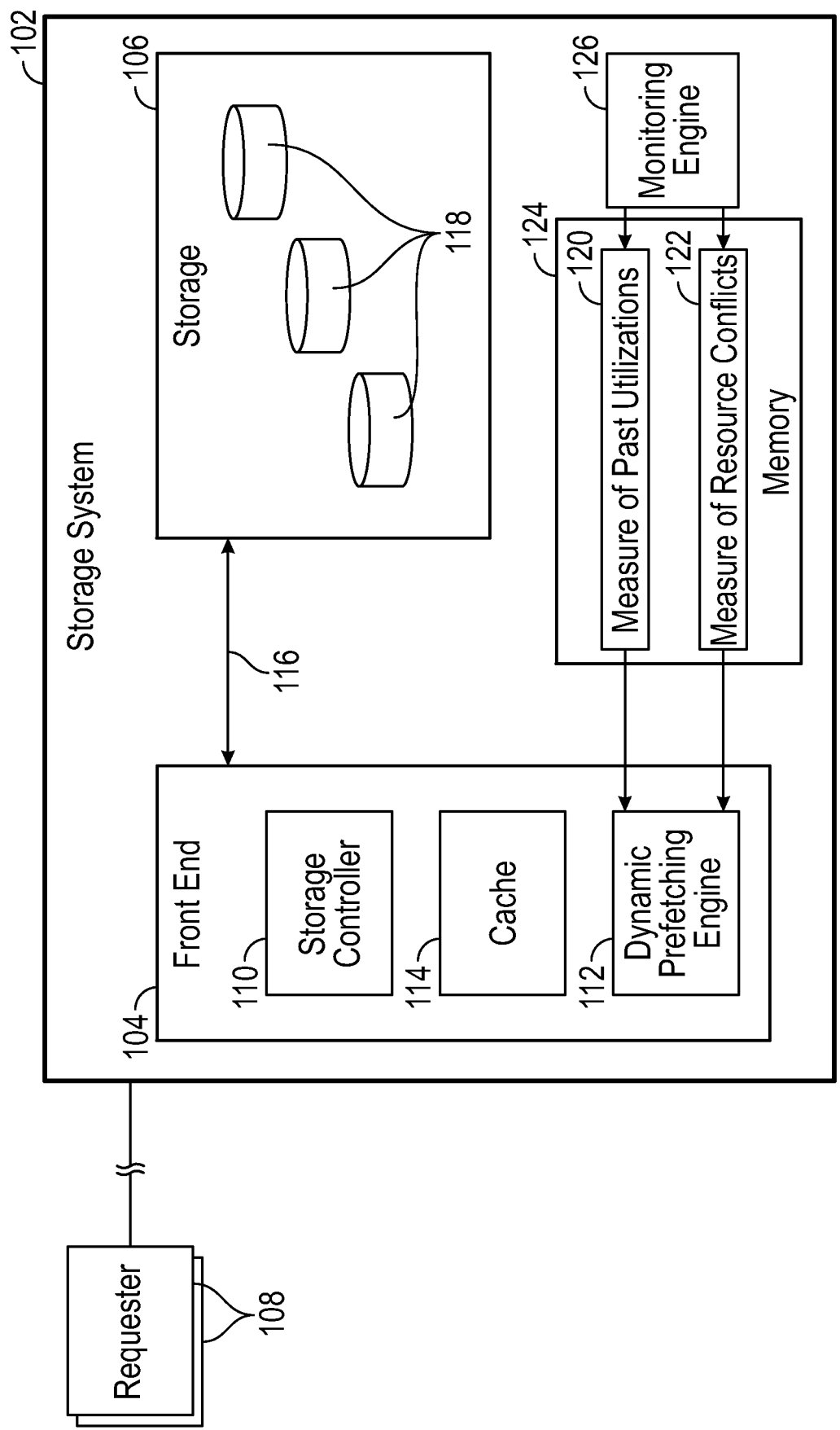
FIG. 1 is a block diagram of an arrangement that includes a storage system that has a dynamic prefetching engine according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Data can be prefetched from storage (implemented with storage device(s) that can include a mixture of different types of storage devices) into a cache to improve access speeds for subsequently received requests that can be satisfied by retrieving the data from the cache. In some examples, the storage can be implemented with slower storage device(s) (e.g., disk-based storage device(s), solid state drive(s), etc.), while the cache can be implemented with faster memory device(s) (e.g., DRAM device(s), SRAM device(s), flash memory device(s), etc.).

More generally, a "cache" can refer to any type of storage that can be used to store a copy of data that is present in another storage. In other examples, a "cache" can store data that is not present in another storage. A "prefetch cache" can refer to a cache that is used to store prefetched data, as prefetched from another storage. Note that a cache can be used for various different purposes, including storing prefetched data as well as storing other forms of cached data.

Prefetching data from storage can refer to retrieving data from the storage that is not currently the subject of any access request from a requester. An access request can refer to a read request or a write request. A "requester" can refer to any entity that is capable of requesting a read or write access of data. For example, the requester can include a program or a machine. As another example, the requester can be a user.

Data is prefetched based on a judgment that the prefetched data has a likelihood of being the subject of subsequent requests in the relatively near future, given an actual pattern of accesses of data from storage. Prefetching data from the storage into the cache allows for a subsequently received access request from a requester to be satisfied using the prefetched data in the cache. To satisfy an access request, data is accessed in the cache. If requested data is not present in the cache when an access request for that data is received, the requested data is retrieved from storage into the cache and then accessed in the cache. If the requested data is among prefetched data already present in the cache when the access request is received, then the requested data can be accessed more quickly than if the same data were first to be retrieved from the storage in response to the access request, and then accessed in the cache. The cache generally also has faster access speed than storage.

In some examples, accesses of data can be sequential in nature. For example, a series of access requests from a requester (or from multiple requesters) may be requests for consecutive portions of data in the storage. Consecutive portions of data in the storage can refer to portions with consecutive physical or logical addresses, or block numbers, or page numbers, or any other identifiers representing an order in which the portions of data are received or stored by the system. In response to a first access request, a prefetching process can prefetch additional portions of data (that are part of the consecutive portions of data) into the cache, with the expectation that subsequently received requests would have a likelihood to be for the prefetched data.

However, prefetching data is associated with usage of resources, including storage resources (for storing the prefetched data), processing resources (for implementing the logic to decide what data to prefetch), and communication resources (to transfer the prefetched data from the storage to the cache). If prefetched data is not used before the prefetched data is evicted (such as to provide storage space for other input/output (I/O) operations), then the resource usage associated with the prefetching of data into the cache would be wasted. The likelihood of evicting prefetched data from the cache is higher if the I/O load of the system is relatively high and the cache is full or almost full.

In addition, resource conflicts can occur between the prefetching process and another process that can share the cache. For example, the prefetching process may prefetch data into portions of the cache that may also be the subject of access from another process. In some examples, a cache can be arranged as pages of data, where each "page" of data has a specified size (the specified size is fixed or tunable).

Resource conflicts may be in the form of lock conflicts. For example, to access a given page of the cache, a lock may have to be acquired by the requesting entity (e.g., the prefetching process), which can prevent another entity (e.g., a requester) from accessing the given page since the other entity would not be able to acquire the lock on the given page.

If resource conflicts associated with accesses of the cache occur at a high rate, that can lead to reduced system performance since prefetching processes may prevent other requesters from quickly completing their input/output (I/O) operations, or I/O operations of other requesters can delay completion of prefetching operations.

Resource conflicts can reduce the benefit associated with prefetching data into the cache, particularly if the storage is implemented using storage device(s) with relatively fast access speeds. In such examples, if the I/O load of the system is relatively high and the likelihood of resource conflicts in accessing the cache is relatively high, then overall system performance may be improved by avoiding prefetching of data. The penalty associated with retrieving data from the storage (rather than the cache) is reduced if the storage is implemented using faster storage device(s).

It can be difficult to determine when to turn prefetching on or off, since the I/O load of the system can change rapidly over time.

In accordance with some implementations of the present disclosure, a prefetching load is dynamically adjusted based on one or more measures, including a measure of past utilizations of a prefetch cache and/or a measure of access conflicts in accesses of the prefetch cache. A "prefetching load" refers generally to an amount of prefetch operations that is occurring or that is scheduled in a system.

FIG. 1 is a block diagram of an example arrangement that includes a storage system 102 that has a front end 104 and storage 106, which can be considered part of a back end of the storage system 102. The "front end" of the storage system 102 refers to a collection of components of the storage system 102 that interacts with the requesters 108 over a network and performs operations to manage the access of data in the storage 106 in response to requests from the requesters 108.

The "back end" of the storage system 102 refers to the storage infrastructure that stores data. The storage 106 includes a collection of storage devices 118 (one storage device or multiple storage devices).

In examples according to FIG. 1, the front end 104 includes a storage controller 110 that manages access of the storage 106 in response to requests from requesters. The storage controller 110 can receive a request from a requester 108, such as a write request or a read request. In response to the request, the storage controller 110 can issue commands over a communication link 116 to the storage 106 to perform the writing or reading of data.

The front end 104 also includes a dynamic prefetching engine 112 according to some implementations of the present disclosure. The dynamic prefetching engine 112 is able to dynamically adjust the prefetching load of the storage system 102 based on specified criteria (discussed further below).

As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

The front end 104 also includes a cache 114 that can be used to store data, such as a copy of data stored in the storage 106 or other data. In some examples, the dynamic prefetching engine 112 can prefetch data from the storage 106 into the cache 114. The cache 114 can thus store prefetched data as well as other data. The cache 114 can be implemented using a collection of memory devices (one memory device or multiple memory devices).

In some examples, there may be multiple I/O operations initiated by the requesters 108 and/or other entities that may involve storing respective data into the cache 114. The multiple I/O operations can include reads of sequential streams of data from the storage 106, random reads of data from the storage 106, writes of data to the storage 106, and so forth. A "sequential stream" of data can refer to a series of portions of data that are stored in consecutive physical storage locations in the storage 106. A "random read" of data can refer to a read operation that is able to access data from any given storage location in the storage 106, as specified by a storage address.

The multiple I/O operations may compete with the dynamic prefetching engine 112 in accessing the cache 114 (a shared resource), which can give rise to resource conflicts at the cache 114, especially if the I/O load in the storage system 102 is relatively heavy.

As noted above, resource conflicts may occur due to lock conflicts when entities attempt to acquire locks to write to pages in the cache 114. While one entity (e.g., the dynamic prefetching engine 112) is holding a lock on a page in the cache 114 to perform a prefetch operation, another entity would not be able to access the same page, which can delay an I/O operation of the other entity.

As another example, after data has been prefetched by the dynamic prefetching engine 112 into the cache 114, a subsequent I/O operation may cause some or all of the prefetched data to be evicted from the cache 114, such as when the cache 114 is full. As a result, the prefetched data in the cache 114 may be evicted before the prefetched data is ever read, which results in wasted resource usage associated with the prefetching of data.

To address the foregoing issues, the dynamic prefetching engine 112 is able to dynamically adjust a prefetching load based on one or more measures, including a measure 120 of past utilizations of a prefetch cache and/or a measure 122 of resource conflicts in accesses of the cache 114.

The measures 120 and 122 can be stored in a memory 124 of the storage system 102. The memory 124 can be implemented using a collection of memory devices (one memory device or multiple memory devices). In other examples, the measures 120 and 122 can be stored in the cache 114 or in another storage location.

In some examples, the storage system 102 includes a monitoring engine 126 that is able to monitor accesses of the cache 114 to derive the measures 120 and 122.

The measure 120 of past utilizations of the prefetch cache refers to how effective use of the prefetch cache has been historically, such as in a given time interval (e.g., past hour, past 24 hours, past week, etc.). In some examples, the measure 120 of past utilizations of the prefetch cache can include a prefetch cache utilization (P). Note that the "prefetch cache" can refer to any cache, or a portion of a cache, that is used by the dynamic prefetching engine 112 to store prefetched data. In some examples, P can be expressed as a percentage, such as a percentage of reads of data stored in the prefetch cache that resulted in a prefetch cache hit. A "prefetch cache hit" occurs when a read is satisfied from the prefetch cache. P can be expressed as a percentage of all accesses of the prefetch cache (in a given time interval) that resulted in cache hits. The monitoring engine 126 can derive the prefetch cache utilization (P) based on monitoring the accesses of the prefetch cache in the given time interval and which of those accesses resulted in a cache hit.

In other examples, the measure 120 of past utilizations of the prefetch cache can be expressed using other parameters, such as a count of cache hits per unit time, and so forth.

The measure 122 of resource conflicts in accesses of the cache 114 provides an indication of a magnitude of conflicts arising from accesses of the cache 114 by different entities. For examples, the measure 122 can be based on a quantity of occurrences in which one or more entities are unable to access the cache 114 (e.g., an entity is unable to obtain a lock to access a page of the cache 114 because the lock is being held by another entity, such as the dynamic prefetching engine 112). The measure 122 is also referred to as a resource conflict measure (C). For example, the measure 122 can be based on a quantity of occurrences of read conflicts in accessing pages containing prefetched data in the cache 114, such as due to an inability to acquire a lock. As another example, the measure 122 can be based on a ratio between a quantity of accesses of prefetched data in the cache 114 that resulted in a conflict to the overall quantity of accesses of the prefetched data in the cache 114.

The monitoring engine 126 can derive the measure 122 (or C) based on observing the accesses of the prefetched data in the cache 114 that resulted in a lock conflict, for example.

Figure 2:
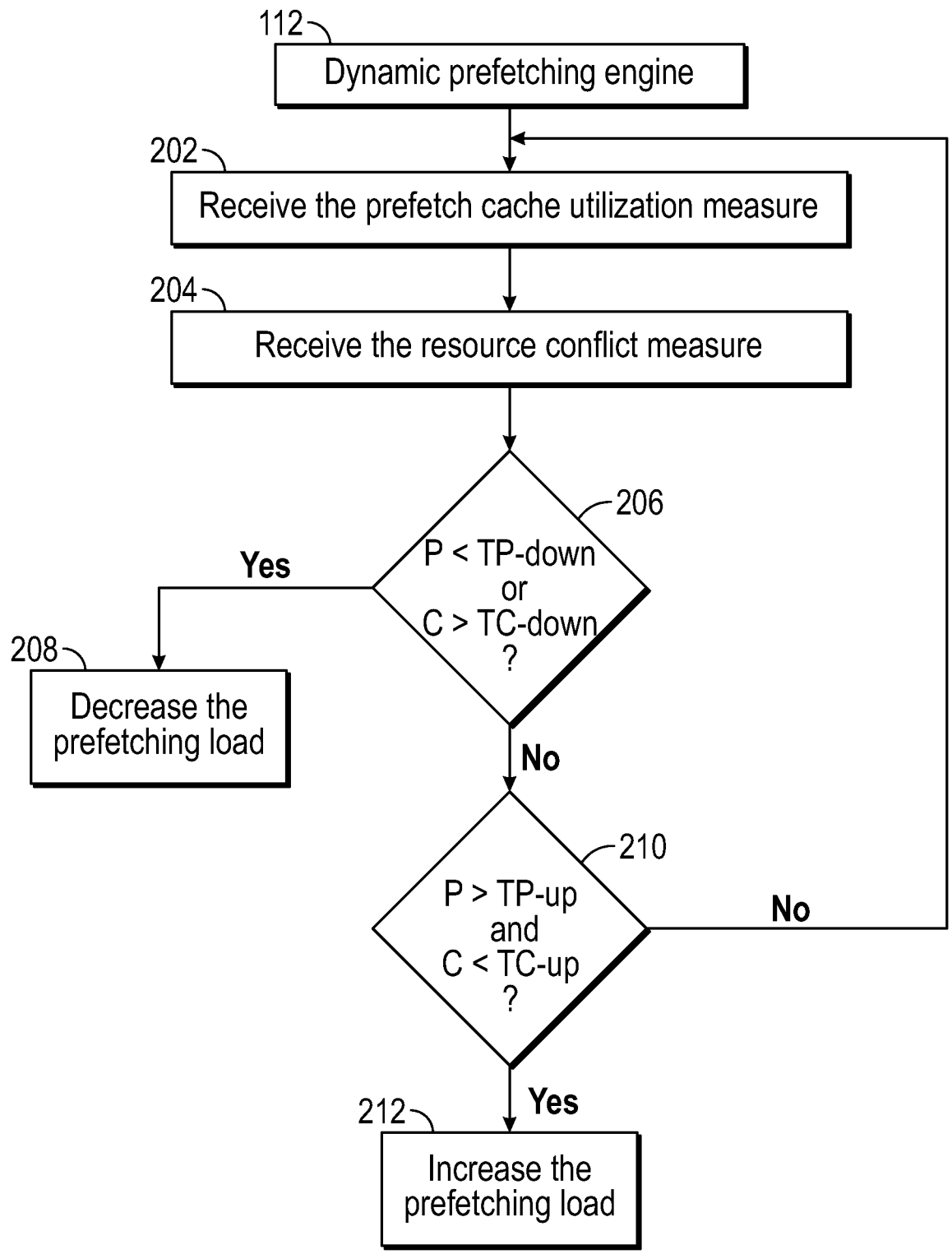
FIG. 2 is a flow diagram of a process of a dynamic prefetching engine according to some examples.

FIG. 2 is a flow diagram of a process performed by the dynamic prefetching engine 112 according to some examples. Although FIG. 2 depicts tasks in a specified order, it is noted that in other examples, tasks can be performed in a different order, and some of the tasks may be omitted and other tasks added.

The dynamic prefetching engine 112 receives (at 202) the prefetch cache utilization measure (P), and receives (at 204) the resource conflict measure (C), which is a measure of resource conflicts in accesses of prefetched data in the cache. The dynamic prefetching engine 112 can receive P and C by retrieving the measures from the memory 124, for example.

The dynamic prefetching engine 112 then decides whether or not an adjustment of prefetching load is to performed based on the prefetch cache utilization measure (P) and the resource conflict measure (C). The adjustment of prefetching load can include either increasing the prefetching load or decreasing the prefetching load.

To make the decision on whether or not to increase or decrease the prefetching load, the dynamic prefetching engine 112 compares the values of P and C to scale-up thresholds (TP-up and TC-up) and scale-down thresholds (TP-down and TC-down). The values of P and C are compared to the scale-up thresholds (TP-up and TC-up) to determine whether the prefetching load should be increased, and the values of P and C to scale-down thresholds (TP-down and TC-down) to determine whether the prefetching load should be decreased. In some examples, the values of TP-down and TP-up can be different, and the values of TC-down and TC-up can be different. In other examples, the values of TP-down and TP-up can be the same, and/or the values of TC-down and TC-up can be the same.

Specifically, the dynamic prefetching engine 112 determines (at 206) if P<TP-down or C>TC-down. P being less than TP-down indicates that prefetch cache utilization is sufficiently low such that the prefetching load should be decreased. C being greater than TC-down indicates that resource conflicts associated with accesses of prefetched data are sufficiently high such that the prefetching load should be decreased.

In response to determining that P<TP-down or C>TC-down, the dynamic prefetching engine 112 decreases (at 208) the prefetching load. In another example, the prefetching load is decreased in response to determining both P<TP-down and C>TC-down.

Assuming that neither of the conditions checked at 206 is true, the dynamic prefetching engine 112 determines (at 210) if P>TP-up and C<TC-up. P being greater than TP-up indicates that prefetch cache utilization is high, and C being less than TC-up indicates that resource conflicts associated with accesses of prefetched data are low. If both the conditions checked at 210 are true, the dynamic prefetching engine 112 increases (at 212) the prefetching load.

If the P>TP-up and C<TC-up condition is not true, the dynamic prefetching engine 112 does not change the prefetching load, and returns to task 202.

Figure 3:
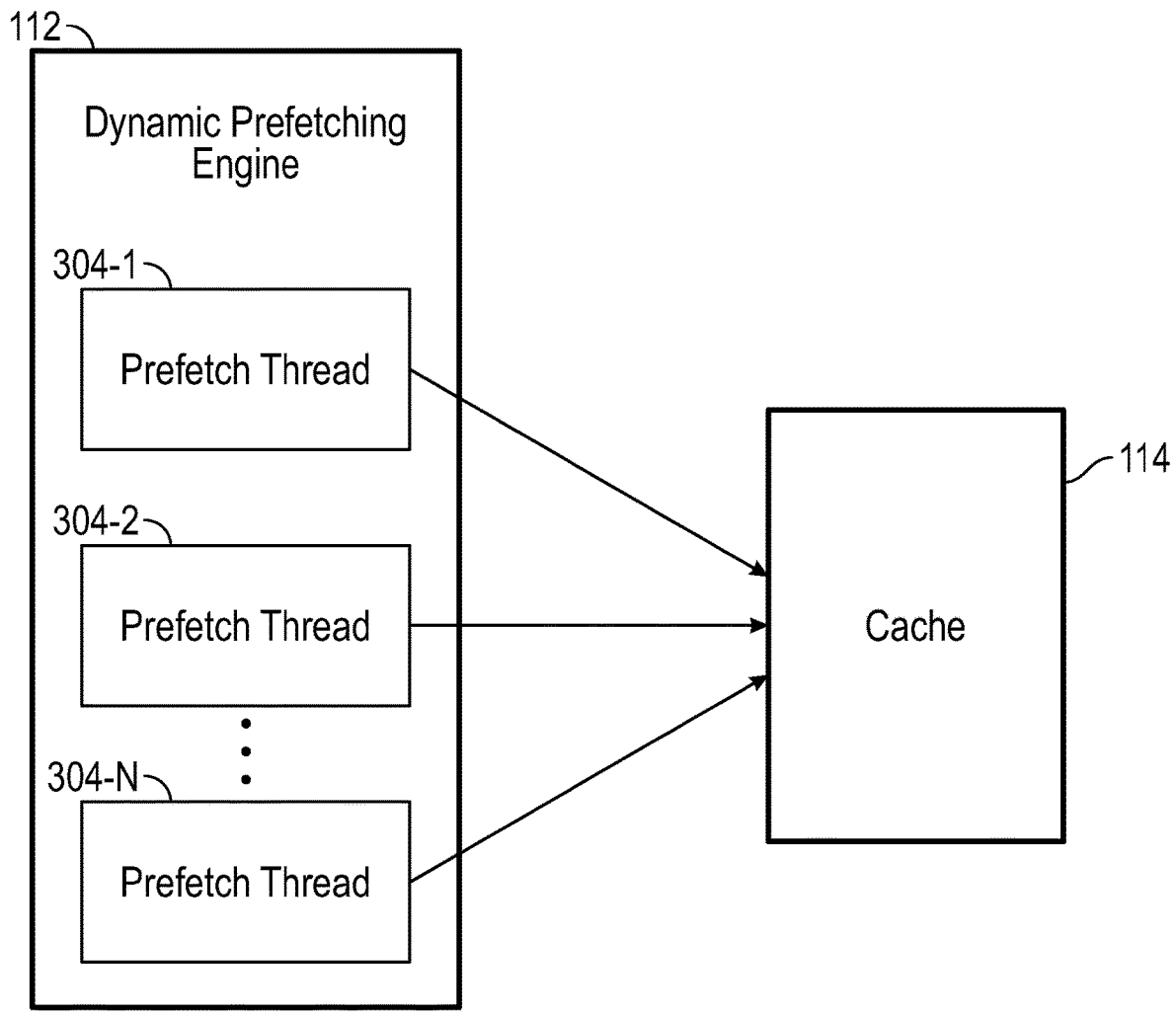
FIG. 3 is a block diagram of an arrangement in which a dynamic prefetching engine can control a quantity of prefetch threads, according to some examples.

As shown in FIG. 3, in some examples, a prefetching load can refer to a quantity of prefetch threads 304-1, 304-2, ..., 304-N (N≥1) that are actively prefetching data from the storage 106 to the cache 114, which is also referred to as a "prefetch cache" because the cache 114 stores prefetched data (as well as other types of data).

The dynamic prefetching engine 112 can start a prefetch thread for each I/O operation that the dynamic prefetching engine 112 has determined would benefit from prefetching of data. An example of such an I/O operation is an I/O operation that retrieves data portions in sequence from the storage 106. Different I/O operations can be initiated by different requesters 108 or other entities. An I/O operation can cause data to be retrieved from the storage 106 in an I/O traffic stream.

A "prefetch thread" can refer to a respective prefetch operation that is started by the dynamic prefetching engine 112 for a corresponding I/O operation that is initiated by an entity, such as a requester 108. The dynamic prefetching engine 112 can perform separate prefetch operations (in the form of prefetch threads) in response to different I/O operations.

FIG. 3 shows N prefetch threads 304-1, 304-2, ..., 304-N that are actively prefetching data to the prefetch cache. In some examples, there can be a maximum quantity of prefetch threads that can be active at any given time; in other words, the dynamic prefetching engine 112 is not allowed to start more than the maximum quantity of prefetch threads.

To dynamically adjust the prefetching load, the dynamic prefetching engine 112 can increase or decrease the quantity (N) of prefetch threads. The adjustment of the quantity (N) of prefetch threads can be based on the prefetch cache utilization measure (P) and the resource conflict measure (C), as discussed above.

A dynamic decrease of the quantity of prefetch threads (N) can be computed according to the following equation:

$$N = \frac{N}{\left(\frac{100-P}{K}+1\right)} \cdot D \text{ (Step)}, \quad \text{(Eq. 1)}$$

where K is a constant (e.g., 10 or a different constant), and D(Step) represents a quantity of threads to scale down in each iteration. For example, D(Step) can be 1, 2, 3, and so forth. Eq. 1 is used if P<TP-down or C>TC-down as determined at 206 in FIG. 2. Eq. 1 incrementally decreases the quantity of prefetch threads.

A dynamic increase of the quantity of prefetch threads (N) can be computed according to the following equation:

$$N=N+I(\text{Step}), \tag{Eq. 2}$$

where I(Step) represents a quantity of threads to increase in each iteration. For example, I(Step) can be 1, 2, 3, and so forth.

Eq. 2 is used if P>TP-up and C<TC-up, as determined at 210 in FIG. 2. Eq. 2 incrementally increases the quantity of prefetch threads.

Figure 4:
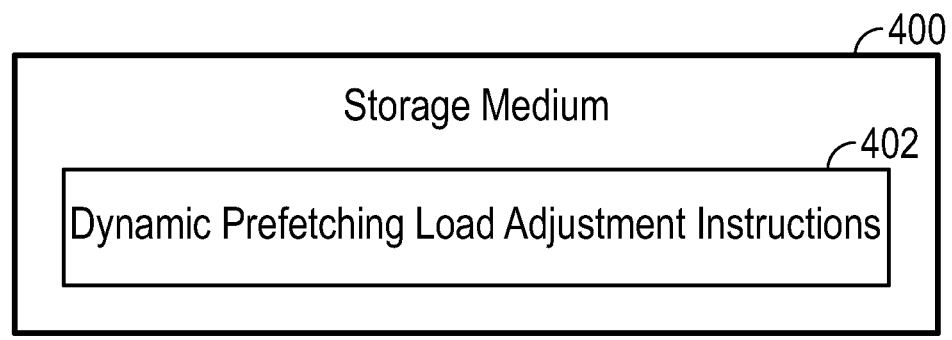
FIG. 4 is a block diagram of a storage medium storing machine-readable instructions according to some examples.

FIG. 4 is a block diagram of a non-transitory machine-readable or computer-readable storage medium 400 storing machine-readable instructions that upon execution cause a system to perform various tasks.

The machine-readable instructions include dynamic prefetching load adjustment instructions 402 to dynamically adjust a prefetching load with respect to a prefetch cache based on a measure (e.g., P) of past utilizations of the prefetch cache, where the prefetching load is to prefetch data from storage into the prefetch cache.

In some examples, the prefetching load is dynamically adjusted by dynamically adjusting a quantity of prefetching threads (e.g., 304-1 to 304-N in FIG. 3) that are to prefetch the data from the storage into the prefetch cache.

In some examples, the machine-readable instructions are to dynamically adjust the prefetching load further based on a measure (e.g., C) of conflicts in accesses of prefetched data in the prefetch cache.

In some examples, the measure of conflicts in accesses of the prefetched data in the prefetch cache is based on a quantity of occurrences in which one or more entities are unable to access the prefetch cache.

In some examples, the measure of conflicts in accesses of the prefetched data in the prefetch cache is based on a quantity of occurrences of read conflicts in accessing the prefetch cache.

In some examples, the measure of conflicts in accesses of the prefetched data in the prefetch cache is based on a quantity of occurrences in which one or more entities are unable to obtain locks to access the prefetch cache.

In some examples, the measure of past utilizations of the prefetch cache is based on a percentage of prefetched data stored in the prefetch cache that was accessed.

In some examples, the measure of past utilizations of the prefetch cache is based on a percentage of reads of data stored in the prefetch cache that resulted in a cache hit.

In some examples, the machine-readable instructions are to dynamically adjust the prefetching load by incrementally decreasing the prefetching load in response to the measure of past utilizations of the prefetch cache satisfying a threshold (e.g., P<TP-down).

In some examples, the machine-readable instructions are to dynamically adjust the prefetching load by incrementally increasing the prefetching load in response to the measure of past utilizations of the prefetch cache satisfying a threshold (e.g., P>TP-up).

In some examples, the machine-readable instructions are to dynamically adjust the prefetching load by incrementally reducing the prefetching load in response to the measure of past utilizations of the prefetch cache satisfying the first threshold (e.g., P<TP-down), and incrementally increasing the prefetching load in response to the measure of past utilizations of the prefetch cache satisfying a second threshold different from the first threshold (e.g., P>TP-up).

In some examples, the machine-readable instructions are to dynamically adjust the prefetching load further based on a measure of conflicts in accesses of prefetched data in the prefetch cache, the dynamic adjustment of the prefetching load including incrementally reducing the prefetching load in response to the measure of past utilizations of the prefetch cache satisfying a first scale-down threshold or the measure of conflicts in accesses of the prefetched data in the prefetch cache satisfying a second scale-down threshold (e.g., P<TP-down or C>TC-down), and incrementally increasing the prefetching load in response to the measure of past utilizations of the prefetch cache reaching a first scale-up threshold and the measure of conflicts in accesses of the prefetched data in the prefetch cache satisfying a second scale-up threshold (e.g., P>TP-up and C<TC-up).

Figure 5:
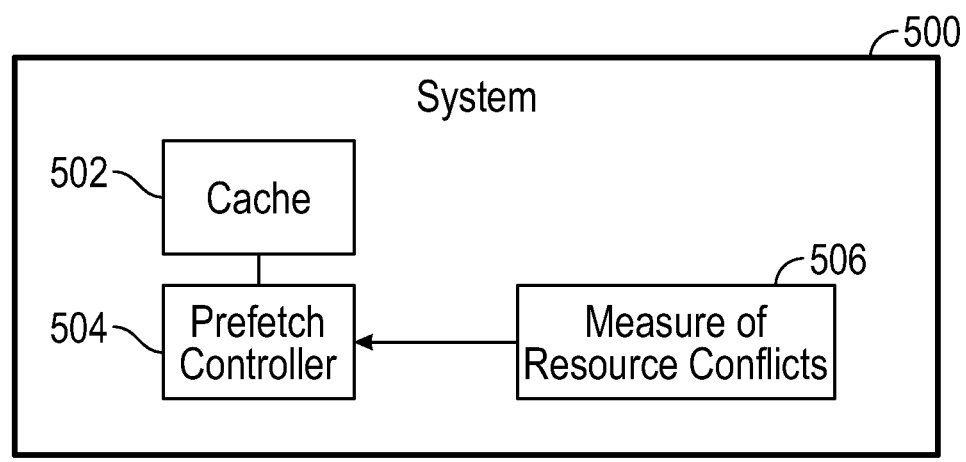
FIG. 5 is a block diagram of a system according to some examples.

FIG. 5 is a block diagram of a system 500 (e.g., the storage system 102 of FIG. 1 or another computing system).

The system 500 includes a cache 502 to store data prefetched from storage. The system 500 includes a prefetch controller 504 (e.g., the dynamic prefetch engine 112) to dynamically adjust a prefetching load with respect to the cache 502 based on a measure (506) of resource conflicts in accesses of the cache, where the prefetching load is to prefetch data from storage into the cache 502.

In some examples, the prefetch controller 504 is to dynamically adjust the prefetching load further based on a measure of past utilizations of prefetched data in the cache.

Figure 6:
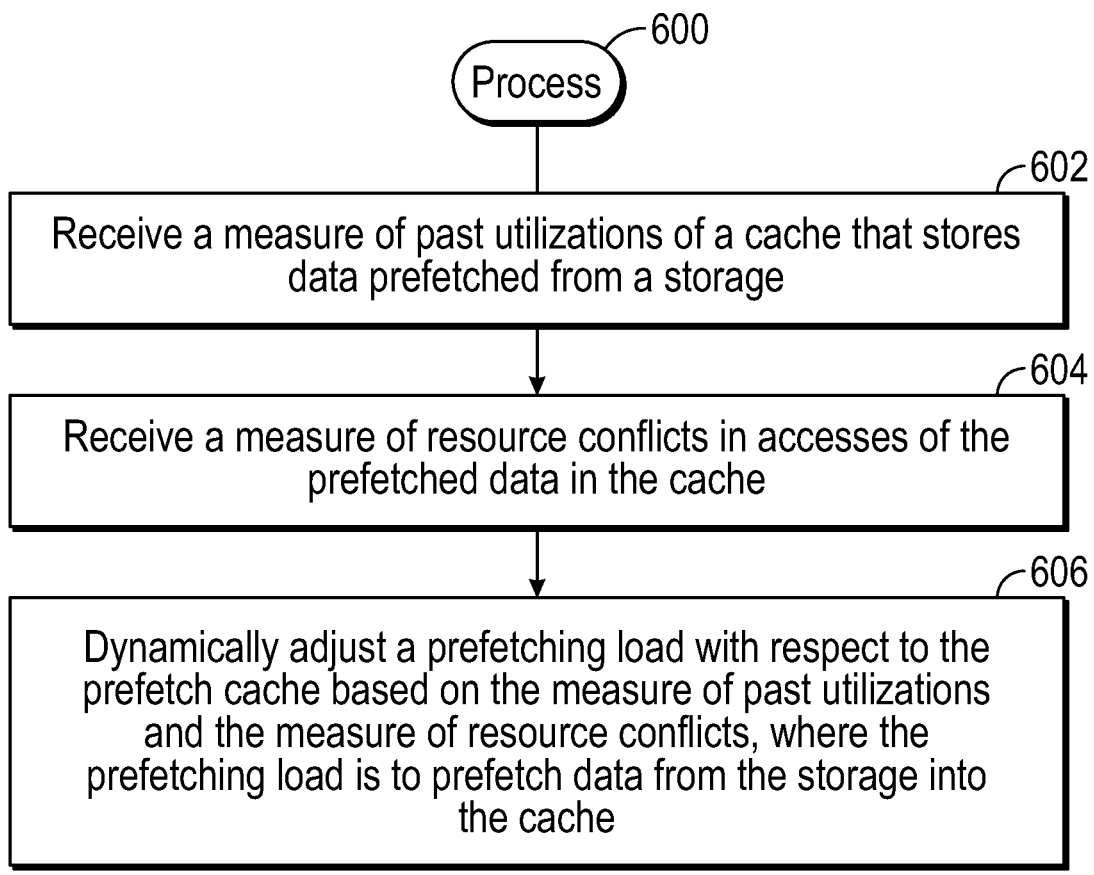
FIG. 6 is a flow diagram of a process according to some examples.

FIG. 6 is a flow diagram of a process 600 according to some examples. The process 600 can be performed in a system having a hardware processor. A hardware processor can include a microprocessor, a core of a multi-core microprocessor, a microcontroller, a programmable integrated circuit, a programmable gate array, or another hardware processing circuit.

The process 600 includes receiving (at 602) a measure of past utilizations of a cache that stores data prefetched from storage. For example, the measure of past utilizations can be retrieved from a memory.

The process 600 includes receiving (at 604) a measure of resource conflicts in accesses of the prefetched data in the cache. For example, the measure of resource conflicts can be retrieved from the memory.

The process 600 includes dynamically adjusting (at 606) a prefetching load with respect to the prefetch cache based on the measure of past utilizations and the measure of resource conflicts, where the prefetching load is to prefetch data from the storage into the cache.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system to:

dynamically adjust a prefetching load with respect to a prefetch cache based on a measure of past utilizations of the prefetch cache and based on a measure of conflicts in accesses of prefetched data in the prefetch cache, wherein the prefetching load is to prefetch data from storage into the prefetch cache, and wherein the measure of conflicts in accesses of the prefetched data in the prefetch cache is based on a quantity of occurrences in which one or more entities are unable to obtain locks to access the prefetch cache.

2. The non-transitory machine-readable storage medium of claim 1, wherein the instructions are to dynamically adjust the prefetching load by dynamically adjusting a quantity of prefetching threads that are to prefetch the data from the storage into the prefetch cache.

3. The non-transitory machine-readable storage medium of claim 1, wherein the occurrences in which the one or more entities are unable to obtain the locks to access the prefetch cache comprise occurrences of read conflicts in accessing the prefetch cache.

4. The non-transitory machine-readable storage medium of claim 1, wherein a lock conflict occurs if a first entity is unable to acquire a lock for a portion of the prefetch cache due to a second entity holding a lock on the portion of the prefetch cache.

5. The non-transitory machine-readable storage medium of claim 1, wherein the measure of past utilizations of the prefetch cache is based on a percentage of the prefetched data stored in the prefetch cache that was accessed.

6. The non-transitory machine-readable storage medium of claim 1, wherein the measure of past utilizations of the prefetch cache is based on a percentage of reads of data stored in the prefetch cache that resulted in a cache hit.

7. The non-transitory machine-readable storage medium of claim 1, wherein the instructions are to dynamically adjust the prefetching load in response to comparing the measure of past utilizations of the prefetch cache to a threshold.

8. The non-transitory machine-readable storage medium of claim 7, wherein the instructions are to dynamically adjust the prefetching load by incrementally decreasing the prefetching load in response to the measure of past utilizations of the prefetch cache satisfying a threshold.

9. The non-transitory machine-readable storage medium of claim 7, wherein the instructions are to dynamically adjust the prefetching load by incrementally increasing the prefetching load in response to the measure of past utilizations of the prefetch cache satisfying a threshold.

10. The non-transitory machine-readable storage medium of claim 7, wherein the threshold is a first threshold, and wherein the instructions are to dynamically adjust the prefetching load by:
   incrementally reducing the prefetching load in response to the measure of past utilizations of the prefetch cache satisfying the first threshold; and
   incrementally increasing the prefetching load in response to the measure of past utilizations of the prefetch cache satisfying a second threshold different from the first threshold.

11. The non-transitory machine-readable storage medium of claim 1, wherein the instructions are to dynamically adjust the prefetching load by:
   incrementally reducing the prefetching load in response to the measure of past utilizations of the prefetch cache satisfying a first scale-down threshold or the measure of conflicts in accesses of the prefetched data in the prefetch cache satisfying a second scale-down threshold; and
   incrementally increasing the prefetching load in response to the measure of past utilizations of the prefetch cache reaching a first scale-up threshold and the measure of conflicts in accesses of the prefetched data in the prefetch cache satisfying a second scale-up threshold.

12. A system comprising:
   a cache to store data prefetched from storage; and
   a prefetch controller to:
      dynamically adjust a prefetching load with respect to the cache based on a measure of resource conflicts in accesses of the cache, wherein the prefetching load is to prefetch data from the storage into the cache, and wherein the measure of resource conflicts in accesses of the cache is based on a quantity of occurrences in which one or more entities are unable to obtain locks to access the cache.

13. The system of claim 12, wherein the prefetch controller is to:
   dynamically adjust the prefetching load further based on a measure of past utilizations of prefetched data in the cache.

14. The system of claim 13, wherein the prefetch controller is to:
   dynamically adjust the prefetching load based on comparing the measure of resource conflicts with a first threshold, and comparing the measure of past utilizations of the prefetched data in the cache with a second threshold.

15. The system of claim 14, wherein the first threshold is a first scale-down threshold, and the second threshold is a second scale-down threshold, and wherein the prefetch controller is to dynamically adjust the prefetching load by incrementally reducing the prefetching load.

16. The system of claim 14, wherein the first threshold is a first scale-up threshold, and the second threshold is a second scale-up threshold, and wherein the prefetch controller is to dynamically adjust the prefetching load by incrementally increasing the prefetching load.

17. A method performed in a system comprising a hardware processor, comprising:
   receiving a measure of past utilizations of a cache that stores data prefetched from storage by a prefetcher;
   receiving a measure of resource conflicts in accesses of the prefetched data in the cache, the measure of resource conflicts based on a quantity of occurrences of one or more entities being unable to access the cache due to the prefetcher accessing the cache; and
   dynamically adjusting a prefetching load with respect to the cache based on the measure of past utilizations and the measure of resource conflicts, wherein the prefetching load is to prefetch data from the storage into the cache.

18. The method of claim 17, wherein dynamically adjusting the prefetching load comprises adjusting a quantity of prefetch threads that are to prefetch data from the storage into the cache.

19. The method of claim 17, wherein the quantity of occurrences of the one or more entities being unable to access the cache comprises a quantity of occurrences of the one or more entities being unable to obtain locks to access the cache.

20. The method of claim 19, wherein the one or more entities are unable to obtain locks to access the cache due to the prefetcher holding a lock on the cache.

* * * * *